(12) United States Patent
Ujimoto et al.

(10) Patent No.: US 9,102,263 B2
(45) Date of Patent: Aug. 11, 2015

(54) INDICATOR FOR VEHICLE TRANSMISSION SHIFT OPERATING DEVICE, AND VEHICLE TRANSMISSION SHIFT OPERATING DEVICE

(71) Applicant: DELTA KOGYO CO., LTD., Fuchu-cho, Aki-gun, Hiroshima (JP)

(72) Inventors: Takushi Ujimoto, Fuchu-cho (JP); Mizuho Ueta, Fuchu-cho (JP); Koichiro Hamaka, Fuchu-cho (JP); Takumi Kusayama, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 240 days.

(21) Appl. No.: 13/761,240

(22) Filed: Feb. 7, 2013

(65) Prior Publication Data

US 2013/0215595 A1 Aug. 22, 2013

(30) Foreign Application Priority Data

Feb. 16, 2012 (JP) ................................. 2012-031457

(51) Int. Cl.
*B60Q 3/02* (2006.01)
*F16H 59/10* (2006.01)
*F16H 63/42* (2006.01)
*G05G 1/015* (2008.04)

(52) U.S. Cl.
CPC ................ *B60Q 3/024* (2013.01); *F16H 59/10* (2013.01); *F16H 63/42* (2013.01); *F16H 2063/423* (2013.01); *G05G 1/015* (2013.01)

(58) Field of Classification Search
CPC .......... B60Q 3/024; F16H 63/42; F16H 59/10
See application file for complete search history.

(56) References Cited

U.S. PATENT DOCUMENTS

| 5,622,086 A | 4/1997 | Suzuki et al. |
| 6,044,790 A | 4/2000 | Murakami |
| 2009/0091313 A1* | 4/2009 | Teeters et al. ............ 324/207.16 |
| 2012/0001747 A1* | 1/2012 | Klatt et al. .................... 340/456 |

FOREIGN PATENT DOCUMENTS

| JP | 11115529 | 4/1999 |
| JP | 2007-307950 | 11/2007 |

* cited by examiner

*Primary Examiner* — Elmito Breval
(74) *Attorney, Agent, or Firm* — Gerald E. Hespos; Michael J. Porco; Matthew T. Hespos

(57) ABSTRACT

The indicator comprises: a light-emitting member capable of emitting light, wherein the light-emitting member has a segment with a shape corresponding to an outline of a gate groove; a face panel disposed in opposed relation to the light-emitting member, and adapted, during the light-emitting of the light-emitting member, to allow light having the shape corresponding to the outline of the gate groove to be transmitted therethrough; and a cover member disposed just above the face panel, and formed with an opening which surrounds a position where the light transmitted through the face panel appears on an outer surface of the face panel.

8 Claims, 11 Drawing Sheets

FIG.10A
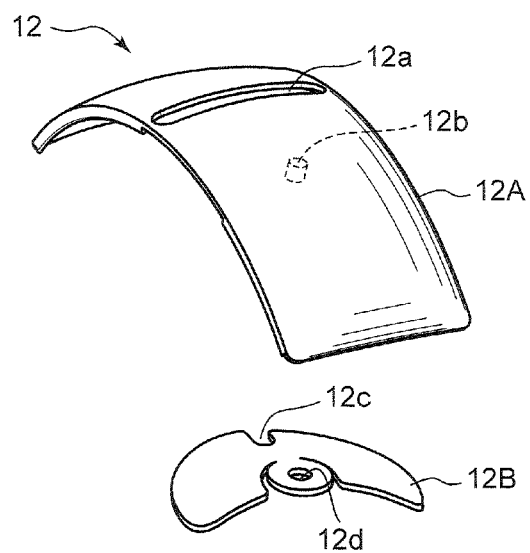
FIG.10B  FIG.10C  FIG.10D
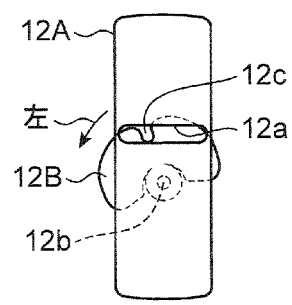 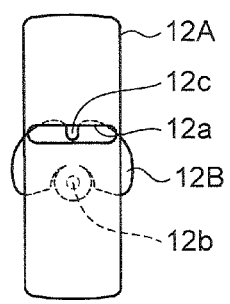 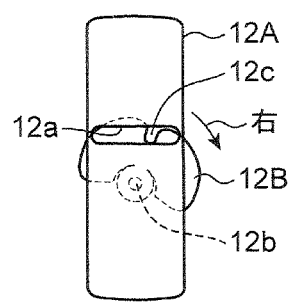

INDICATOR FOR VEHICLE TRANSMISSION SHIFT OPERATING DEVICE, AND VEHICLE TRANSMISSION SHIFT OPERATING DEVICE

BACKGROUND OF THE INVENTION

1. Field of the Invention

The present invention relates to an indicator for a vehicle transmission shift operating device, and a vehicle transmission shift operating device.

2. Background Art

Heretofore, there has been known a vehicle transmission shift operating device constructed as disclosed in JP 2007-307950A. This vehicle transmission shift operating device comprises a gate member (not illustrated) attached to a base 50, and an operating lever 51 adapted to be manually moved in a tilting manner along a step-shaped gate groove formed in the gate member, as illustrated in FIG. 11. The transmission shift operating device is designed to allow a driver to manually move the operating lever 51 in a tilting manner in a front-rear (longitudinal) direction and a right-left (lateral) direction, thereby shifting a non-illustrated transmission.

The transmission shift operating device has a face panel 52 provided with a plurality of translucent indicating sections 52a for indicating respective ranges (P, R, N, D and M ranges). When the operating lever 51 is set at a position corresponding to one of the indicating sections 52a, a corresponding one of a plurality of illuminating lamps disposed on a back side of the face panel 52 is activated to emit light, so that the indicating section 52a is illuminated.

Further, the face panel 52 is formed with an elongate insertion hole 52b having a shape analogous to and generally wider than the gate groove formed in the gate member. Based on the shape of the elongate insertion hole 52b, a driver can ascertain an operation direction and/or an operation position of the operating lever 51.

However, the elongate insertion hole 52b of the face panel 52 has a shape which appears concave with respect to a surface of the face panel 52, and places an important only on functionality, i.e., it is relatively large in width W and depth D. Thus, there is a problem of poor aesthetic appearance.

SUMMARY OF THE INVENTION

It is an object of the present invention to solve the above problem.

Specifically, it is an object of the present invention to provide an indicator for a vehicle transmission shift operating device, which is capable of preventing an elongate insertion hole appearing concave from being formed in a face panel, thereby enhancing aesthetic appearance.

According to one aspect of the present invention, there is provided an indicator for a vehicle transmission shift operating device comprising a gate member formed with a gate groove which allows an operating lever shaft to pass therethrough. The indicator comprises: a light-emitting member capable of emitting light, wherein the light-emitting member has a segment with a shape corresponding to an outline of the gate groove; and a face panel disposed in opposed relation to the light-emitting member, and adapted, during the light-emitting of the light-emitting member, to allow light having the shape corresponding to the outline of the gate groove to be transmitted therethrough.

BRIEF DESCRIPTION OF THE DRAWINGS

FIG. 10A is an exploded perspective view of an example of modification of a concealing member.

FIGS. 10B to 10D are top plan views for explaining states when the modified concealing member is moved.

DESCRIPTION OF EMBODIMENTS

With reference to the drawings, the present invention will now be described in detail based on an embodiment thereof.

Figure 1:
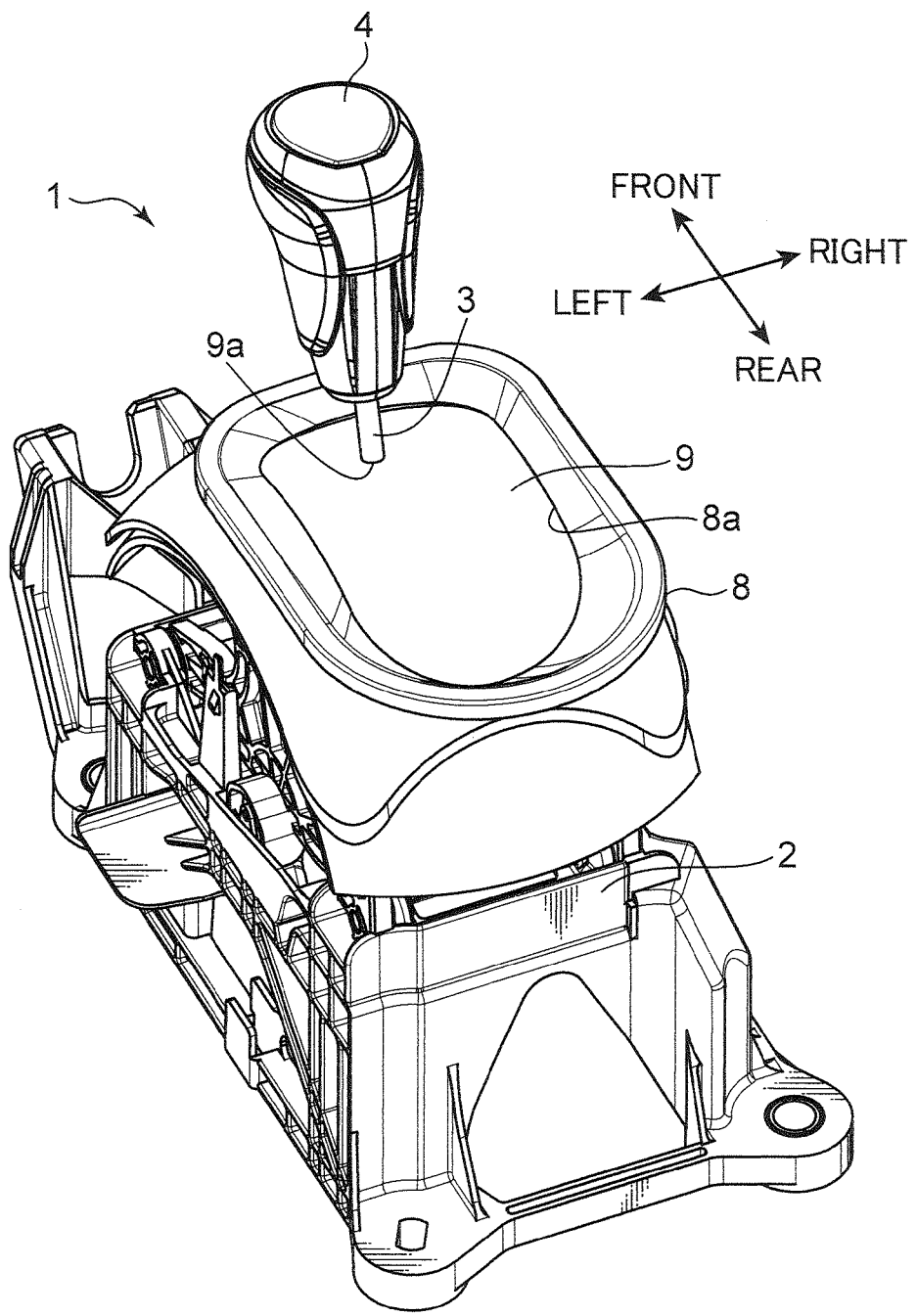
FIG. 1 is a perspective view of a vehicle transmission shift operating device according to one embodiment of the present invention, wherein a face panel is illustrated in a state when a light-emitting member is deactivated to stop light-emitting (unlighted).

FIG. 1 is a perspective view of a vehicle transmission shift operating device 1 according to one embodiment of the present invention, wherein an aftermentioned face panel 9 is illustrated in a state when an aftermentioned light-emitting member 11 is deactivated to stop light-emitting (unlighted).

Figure 2:
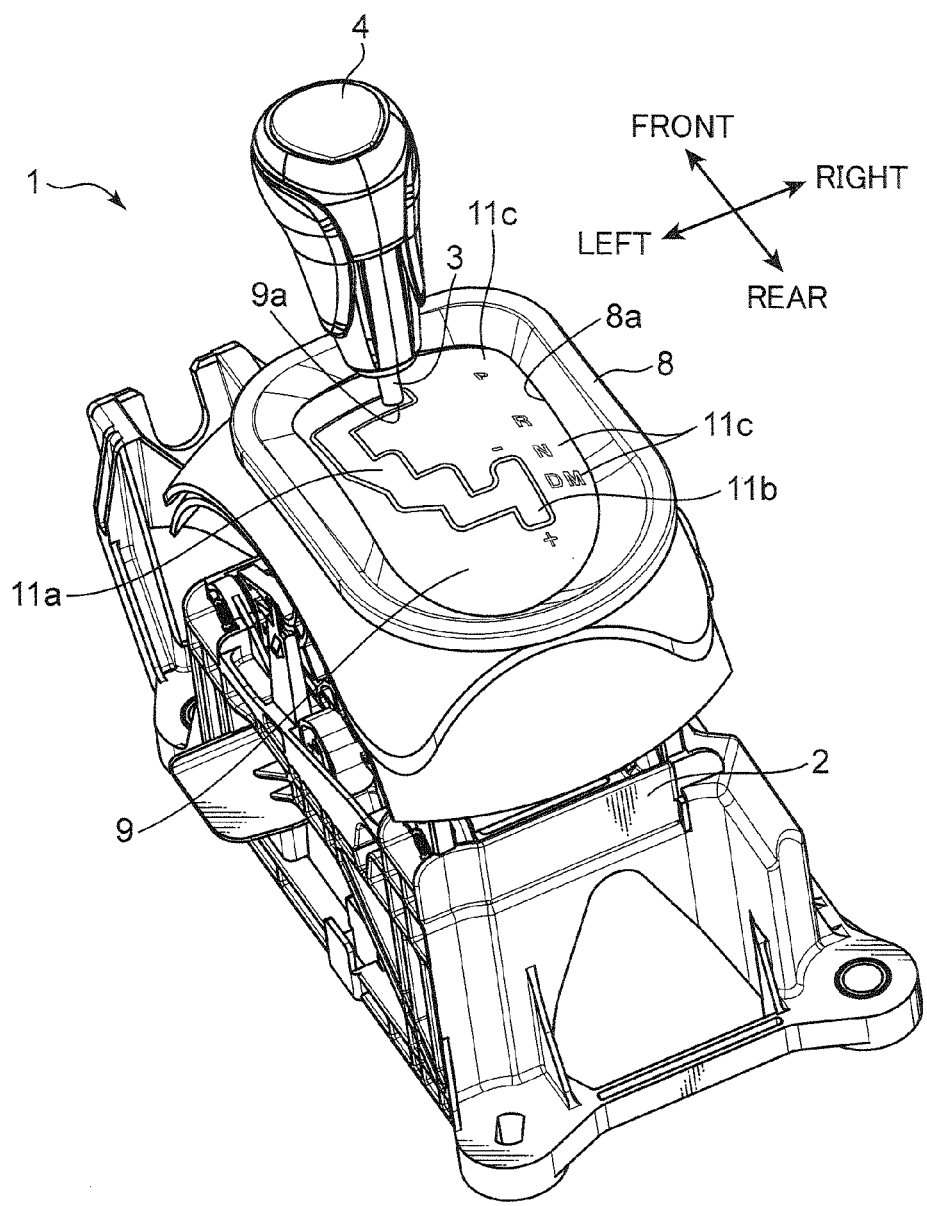
FIG. 2 is a perspective view of the vehicle transmission shift operating device according to the embodiment of the present invention, wherein the face panel is illustrated in a state when the light-emitting member is activated to emit light (lighted).

FIG. 2 is a perspective view of the vehicle transmission shift operating device 1, wherein the face panel 9 is illustrated in a state when the light-emitting member 11 is activated to emit light (lighted).

Figure 3:
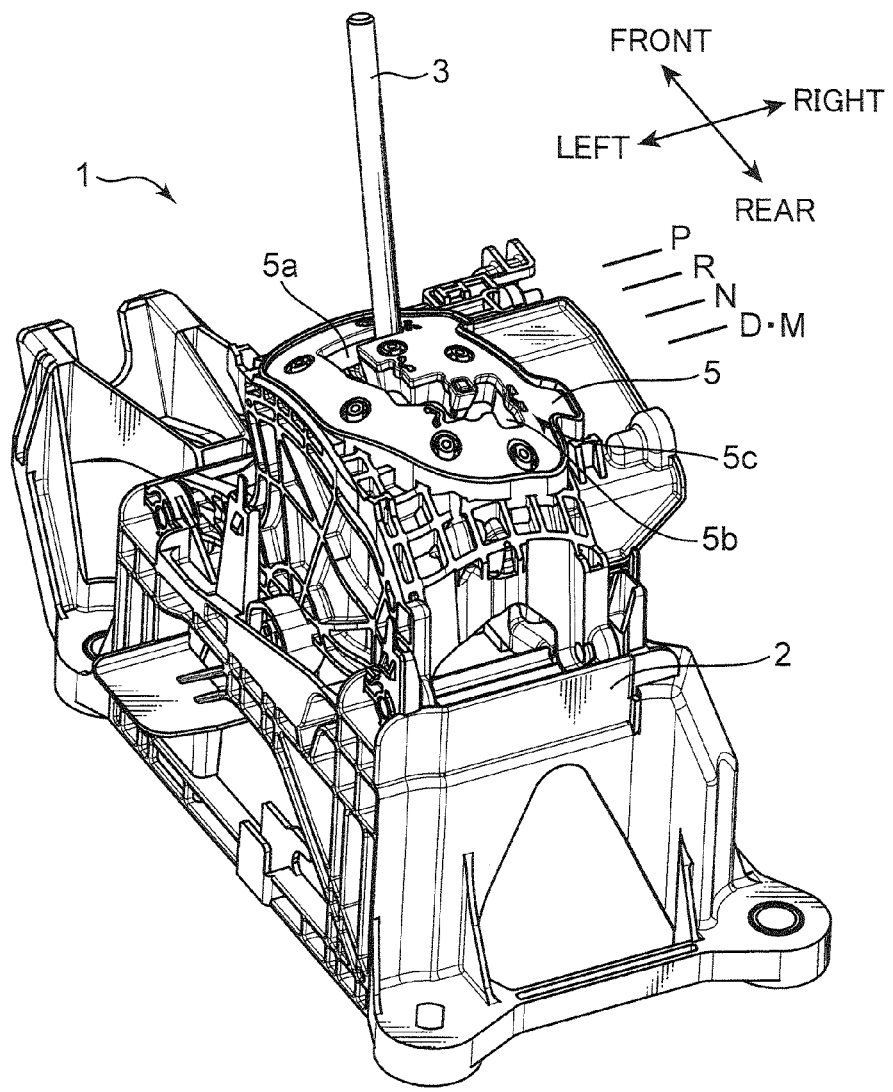
FIG. 3 is a perspective view of the vehicle transmission shift operating device illustrated in FIG. 1, wherein an indicator is removed therefrom.
Figure 4:
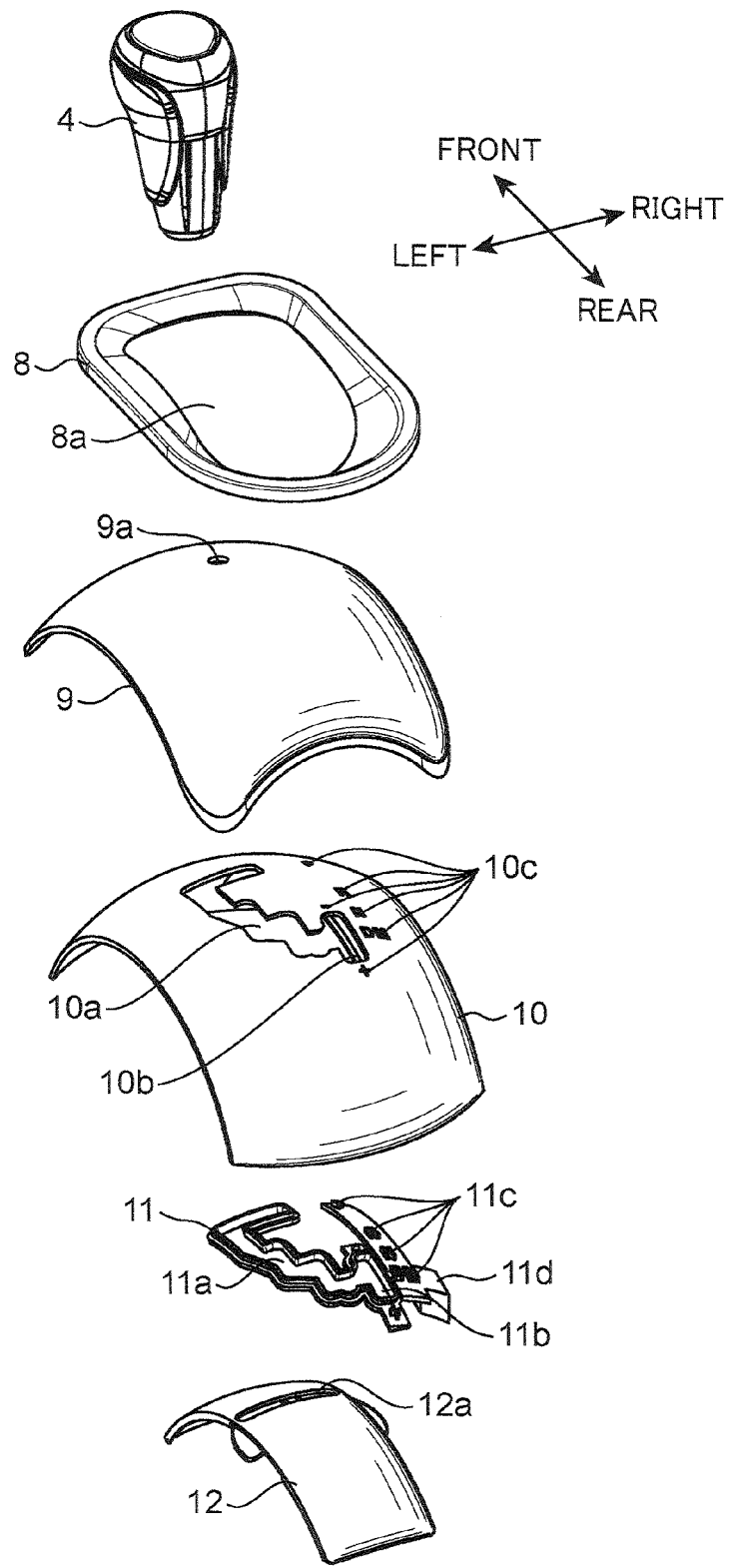
FIG. 4 is an exploded perspective view of the indicator for the vehicle transmission shift operating device illustrated in FIG. 1.

FIG. 3 is a perspective view of the vehicle transmission shift operating device 1, wherein an aftermentioned indicator is removed therefrom. FIG. 4 is an exploded perspective view of the indicator. In FIGS. 1 to 4, the operating device 1 is illustrated in a state when an operating lever shaft 3 is manually moved to a position of an aftermentioned parking (P) range.

Figure 5A:
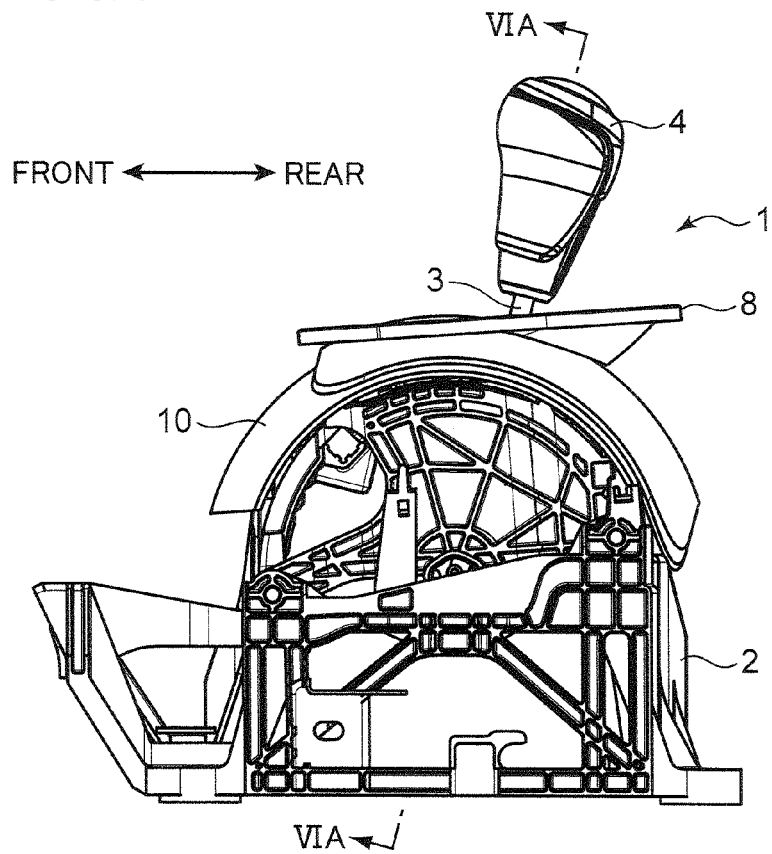
FIG. 5A is a side view of the vehicle transmission shift operating device according to the embodiment of the present invention.
Figure 5B:
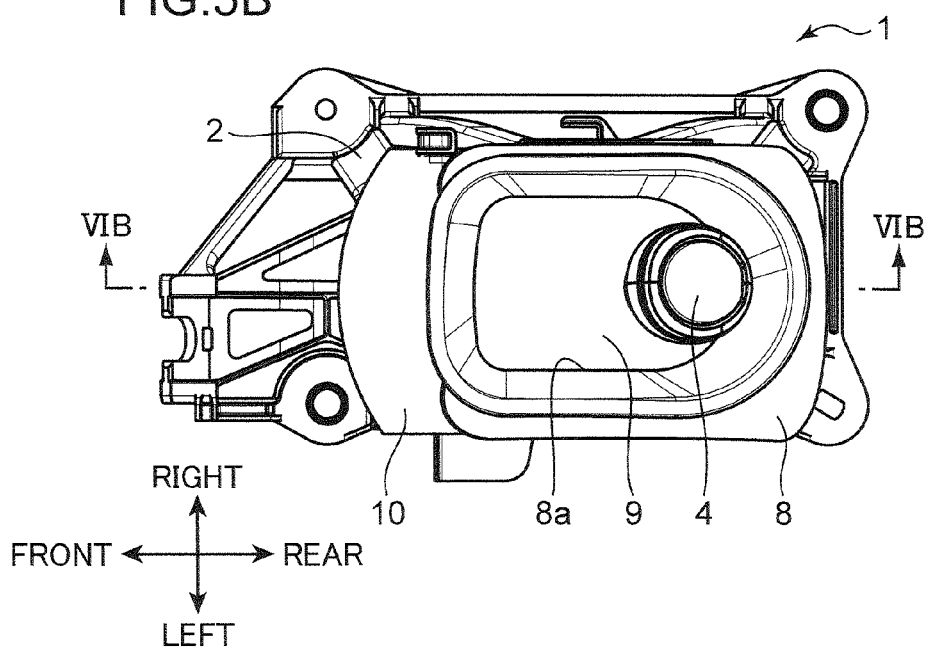
FIG. 5B is a top plan view of the vehicle transmission shift operating device according to the embodiment of the present invention, wherein the face panel is illustrated in the state when the light-emitting member is deactivated to stop light-emitting (unlighted).
Figure 6A:
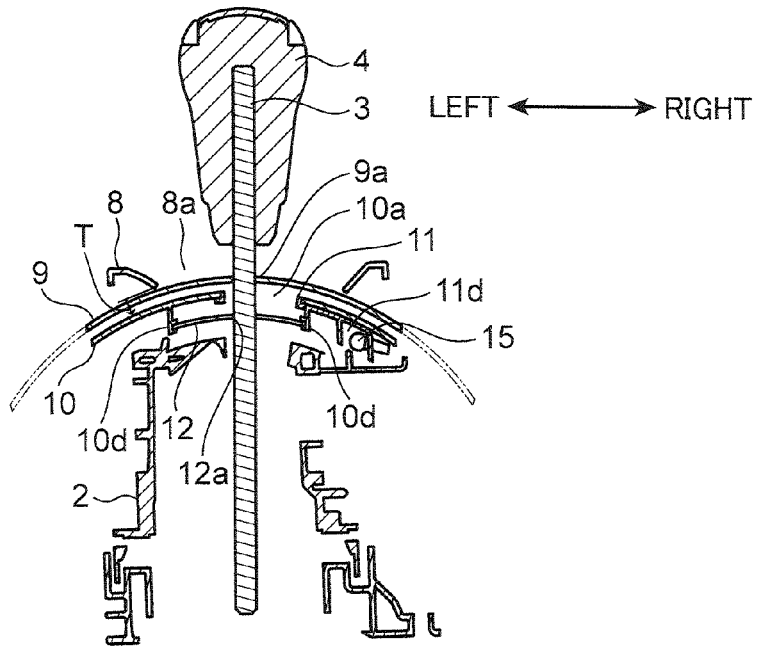
FIG. 6A is a fragmentary sectional view taken along the line VIA-VIA in FIG. 5A.
Figure 6B:
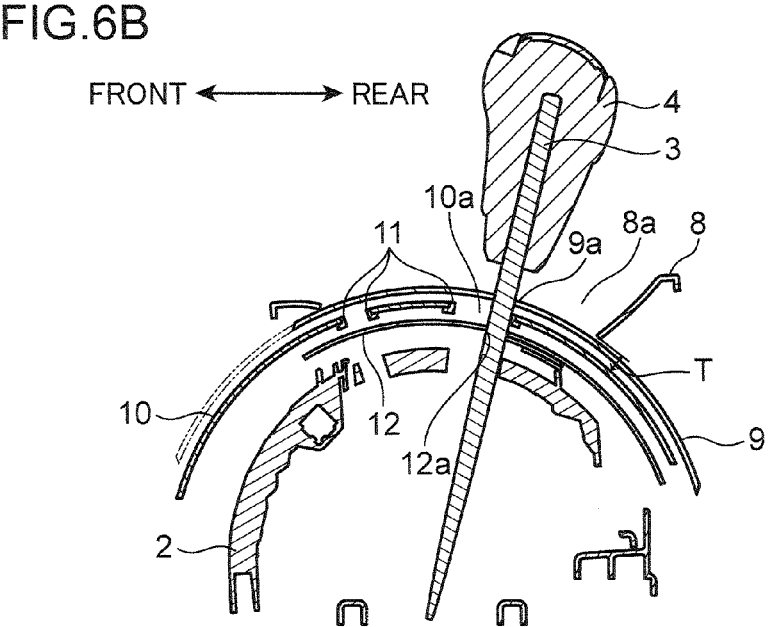
FIG. 6B is a fragmentary sectional view taken along the line VIB-VIB in FIG. 5B.

FIG. 5A is a side view of the vehicle transmission shift operating device 1, and FIG. 5B is a top plan view of the vehicle transmission shift operating device 1, wherein the face panel 9 is illustrated in the state when the light-emitting member 11 is deactivated to stop light-emitting (unlighted). FIG. 6A is a fragmentary sectional view taken along the line VIA-VIA in FIG. 5A, and FIG. 6B is a fragmentary sectional view taken along the line VIB-VIB in FIG. 5B. In FIGS. 5A to 6B, the operating device 1 is illustrated in a state when the operating lever shaft 3 is placed in a position of an aftermentioned drive (D) range.

The vehicle transmission shift operating device 1 is a shift operating device for an automatic transmission (AT) vehicle, and provided with a three-dimensional base 2 composed of a die-casting product or a synthetic resin product. Although various mechanism components and electric components for transmission shift operation are attached to the base 2, illustration of any component other than mechanism components necessary for the following explanation is omitted.

The operating lever shaft 3 has a base end provided with a spherical-shaped base portion (not specifically illustrated). The operating lever shaft 3 is supported by the base 2 through the base portion. An operator (driver) can grip a knob 4 attached to an upper end of the operating lever shaft 3 and manually move an operating lever having the operating lever shaft 3 and the knob 4, in a tilting manner in a front-rear (longitudinal) direction and a right-left (lateral) direction. During this operation, the operating lever shaft 3 is tilted in such a manner as to be swingingly moved about the base portion.

As illustrated in FIG. 3, a gate member 5 is attached to a top portion of the base 2. The gate member 5 is fixed to the base 2. The gate member 5 has a gate groove 5c formed in a shape like a hole penetrating through the gate member 5 in a thickness direction thereof. The operating lever shaft 3 is installed to pass through the gate groove 5c. The gate groove 5c is adapted to guide the operating lever shaft 3 while restricting a tilting direction of the operating lever shaft 3 in the front-rear direction and the right-left direction. The gate groove 5c has a shift operation gate groove 5a and a manual operation gate groove 5b. The shift operation gate groove 5a is formed to extend over respective positions of a parking (P) range, a reverse (R) range, a neutral (N) range, a drive (D) range and a manual (M) range, while bending in the right-left direction or the front-rear direction in a stepped shape. The manual operation gate groove 5b is formed to extend from the position of the manual (M) range in the front-rear direction.

When the operating lever is manually moved by an operator, and the operating lever shaft 3 is moved in a tilting manner, the vehicle transmission shift operating device 1 is operable to shift the transmission in a manner corresponding to a respective one of the P, R, N, D and M ranges.

The vehicle transmission shift operating device 1 is provided with an indicator for indicating thereon the gate groove as a pattern so as to allow an operator to recognize an operation direction of the operating lever. As illustrated in FIG. 4, the indicator comprises a cover member 8, a face panel 9, a set plate 10, a light-emitting member 11, and a concealing member 12. These components are arranged in this order in a downward direction.

The cover member 8 is composed of an opaque member made of a synthetic resin. The cover member 8 is generally formed as a quadrangular frame-like member having an upwardly convex curved shape with an opening 8a in a central portion thereof. This opening 8a has a size capable of surrounding a luminous area which appears on an outer surface of the face panel 9 in respective shapes of aftermentioned gate grooves 11a, 11b and character-shaped convex portions 11c, as a result of light transmitted through the face panel 9 when the gate grooves 11a, 11b and character-shaped convex portions 11c emit light. The cover member 8 is attached, for example, to the base 2 through a non-illustrated member, and held by the base 2.

The face panel 9 is composed of a plate-shaped member made of a synthetic resin which is not completely transparent but has a light transparency enough to allow light from a light emitter or the like to be transmitted therethrough, and formed in a shape curved in the front-rear direction and the right-left direction in an upwardly convex manner. The face panel 9 has a smooth, patternless outer surface. The term "not completely transparent" here specifically means an opaque or translucent property, i.e., a light transparency enough to completely or almost completely prevent an internal mechanism of the operating device 1 from being seen through the face panel 9 not only during a lighted state as described later but also during an unlighted state. For example, such an opaque or translucent property can be obtained by coloring with silver.

The face panel 9 is formed with a through-hole 9a which allows the operating lever shaft 3 to pass therethrough. The face panel 9 has a shape and a size greater than those of the opening 8a of the cover member 8, in the front-rear direction and the right-left direction. Therefore, even when the face panel 9 is moved in an approximately horizontal direction and in the front-rear direction and the right-left direction, in conjunction with a tilting movement of the operating lever shaft 3, the face panel 9 can maintain a state in which it closes the opening 8a of the cover member 8 from therebelow. When the operating lever shaft 3 is a round shaft, the through-hole 9a is preferably formed as a round through-hole. On the other hand, when the operating lever shaft 3 is an angular shaft, the through-hole 9a is preferably formed as an angular through-hole. In other words, it is preferable that the operating lever shaft 3 has a shape which can minimize a gap with respect to the operating lever shaft 3.

The set plate 10 is composed of an opaque, plate-shaped member made of a synthetic resin. The set plate 10 is formed in a shape curved in the front-rear direction and the right-left direction in an upwardly convex manner. That is, the face panel 9 is formed in a shape corresponding to the set plate 10, and adapted to be movable along an upper surface of the set plate 10. The face panel 9 is disposed between the upper surface of the set plate 10 and a lower surface of the cover member 8, and the set plate 10 is configured in a shape and a size enough to be capable of guiding the movement of the face panel 9.

The set plate 10 is formed with a gate groove 10a and a manual operation gate groove 10b each similar to a respective one of the shift operation gate groove 5a and the manual operation gate groove 5b of the gate member 5. More specifically, each of the gate groove 10a and the manual operation gate groove 10b has a shape slightly enlarged in similar relation with respect to a respective one of the shift operation gate groove 5a and the manual operation gate groove 5b. The set plate 10 has seven through-holes 10c which are provided on a right side of the gate grooves 10a, 10b (right side when viewed in a front direction), and formed in five character shapes "P", "R", "N", "D", "M" representing respective ones of the ranges, a character shape "+" representing shift-up, and a character shape "−" representing shift-down. Each of the gate groove 10a, the manual operation gate groove 10b and the through-holes 10c is formed to penetrate the set plate 10 in its thickness direction.

The set plate 10 and the cover member 8 are disposed to define therebetween a gap T for allowing the face panel 9 to be moved in the front-rear direction and the right-left direction. Thus, the face panel 9 is movably held between the cover member 8 and the set plate 10, while being sandwiched between the cover member 8 and the set plate 10. The operating lever shaft 3 is installed to pass through the through-hole 9a of the face panel 9, so that the face panel 9 is free of a risk of dropping out from the gap T between the cover member 8 and the set plate 10. The set plate 10 may be attached to the cover member 8 at a position which does not hinder the face panel 9 from being moved in the front-rear direction and the right-left direction.

The light-emitting member 11 is composed of a member formed using a light-guidable transparent synthetic resin, and has a frame-shaped segment with an opening serving as a gate groove 11a and a manual operation gate groove 11b. Each of the gate groove 11a and the manual operation gate groove 11b has a shape similar to a respective one of the shift operation gate groove 5a and the manual operation gate groove 5b of the gate member 5, and enlarged in similar relation with respect to a respective one of the shift operation gate groove 5a and the manual operation gate groove 5b, to an extent enough to prevent a contact with the operating lever shaft 3. That is, an outer peripheral outline portion of the gate groove 11a and the manual operation gate groove 11b has a shape corresponding to an outline of the shift operation gate groove 5a and the manual operation gate groove 5b of the gate member 5. The operating lever shaft 3 is installed to pass through any of the gate groove 11a and the manual operation gate groove 11b.

The light-emitting member 11 also has a plate-shaped segment which is provided on a right side of the frame-shaped segment, and formed with seven convex portions 11c having five character shapes "P", "R", "N", "D", "M" representing respective ones of the ranges, and two character shapes "+", "−" representing shift-up and shift-down, respectively.

Further, the light-emitting member 11 is provided with a box segment 11d which houses an illuminating lamp 15 (see FIG. 6A) for allowing the outer peripheral outline portion of the gate grooves 11a, 11b and the convex portions 11c to emit light when it is lighted. The illuminating lamp 15 is illustrated as an example of a light source.

The frame-shaped segment serving as the outer peripheral outline portion of the gate groove 11a and the manual operation gate groove 11b in the light-emitting member 11 is fitted into the gate grooves 10a, 10b of the set plate 10 from therebelow (see FIGS. 6A and 6B). The character-shaped convex portions 11c of the light-emitting member 11 are fitted into respective ones of the through-holes 10c of the set plate 10 from therebelow. In this way, the light-emitting member 11 is integrated with the set plate 10. The outer peripheral outline portion of the gate grooves 11a, 11b and the character-shaped convex portions 11c of the light-emitting member 11 are not covered by the set plate 10. Thus, when the lamp 15 is lighted to cause the light-emitting member 11 to emit light, the outer peripheral outline portion of the gate grooves 11a, 11b and the character-shaped convex portions 11c of the light-emitting member 11 can be visually recognized as respective shapes thereof, from above the face panel 9. The indicator may be configured such that a color of light to be emitted from the light-emitting member 11 can be switched between different colors such as yellow, red, blue and green, by a user himself/herself.

The concealing member 12 is composed of an opaque, plate-shaped member made of a synthetic resin. The concealing member 12 is formed in a shape curved in the front-rear direction in an upwardly convex manner. The concealing member 12 is formed with an elongate through-hole 12a which is elongated in the right-left direction and which allows the operating lever shaft 3 to pass therethrough.

Referring to FIG. 6A, the concealing member 12 is supported with respect to the set plate 10 in a manner slidable in the front-rear direction, by a pair of rail groove portions 10d formed on a lower surface of the set plate 10 at positions on right and left sides thereof to extend in the front-rear direction. The concealing member 12 is configured to have a length capable of closing the opening 8a of the cover member 8 and the gate grooves 11a, 11b from therebelow, even when the concealing member 12 is moved in an approximately horizontal direction and in the front-rear direction, in conjunction with a tilting movement of the operating lever shaft 3 in the front-rear direction. On the other hand, when the operating lever shaft 3 is manually moved in a tilting manner in the right-left direction, the operating lever shaft 3 is moved within the elongate through-hole 12a. Thus, the tilting movement of the operating lever shaft 3 can be released, so that the concealing member 12 is not moved in interlocking relation with the operating lever shaft 3. In addition, the operating lever shaft 3 is installed to pass through the elongate through-hole 12a of the concealing member 12, so that the concealing member 12 is free of a risk of dropping out from the rail groove portions 10d.

In assembling of the vehicle transmission shift operating device 1 configured as above, the light-emitting member 11 is attached to the set plate 10. Then, the face panel 9 is disposed between the cover member 8 and the set plate 10 having the light-emitting member 11 integrated therewith, and the concealing member 12 is inserted in the rail groove portions 10d of the set plate 10. In this way, a unitized indicator can be obtained. Further, the gate member 5 is attached to the top portion of the base 2, and the indicator is fixed onto the base 2. Then, after the operating lever shaft 3 is installed to pass through the through-holes 12a, 10a, 9a of the unitized indicator, the knob 4 is attached to the upper end of the operating lever shaft 3, thereby completing the assembling.

The light-emitting member 11 is disposed just above the gate member 5 together with the set plate 10. Thus, when the lamp 15 is lighted, each of the outer peripheral outline portion of the gate grooves 11a, 11b and the character-shaped convex portions 11c emits light in conformity to a shape thereof.

The face panel 9 disposed just above the light-emitting member 11 covers the light-emitting member 11. Thus, during light-emitting of the light-emitting member 11, the face panel 9 allows light having the shape of the outer peripheral outline portion of the gate grooves 11a, 11b and light having the shape of each of the character-shaped convex portions 11c to be transmitted therethrough.

Light with the shape of the outer peripheral outline portion of the gate grooves 11a, 11b and light with the shape of each of the convex portions 11c, each transmitted through the face panel during the light-emitting, can be visually recognized from the opening 8a of the cover member 8 disposed just above the face panel 9.

In the above indicator structure of the vehicle transmission shift operating device 1, the face panel 9 is devoid of the concave, stepped-shaped, elongate insertion hole as described in the Background Art, although it is formed with the through-hole 9a which allows the operating lever shaft 3 to pass therethrough. Thus, the face panel 9 is generally configured to have a smooth and patternless surface, as illustrated in FIG. 1.

For example, when the light-emitting member 11 is activated to emit light (lighted) during a period (e.g., ACC or ON) other than during turn-off of an ignition switch of an engine, light having a shape of the outer peripheral outline portion of the gate grooves 11a, 11b, and light having a shape of each of the character-shaped convex portions 11c are transmitted through the face panel 9. Thus, as illustrated in FIG. 2, the shape of the outer peripheral outline portion of the gate grooves 11a, 11b, and the shape of each of the character-shaped convex portions 11c appear on the smooth surface of the face panel 9 in the form of a luminous pattern.

A driver can ascertain an operation direction of the operating lever shaft 3 by looking at the luminous pattern of the shapes of the outer peripheral outline portion of the gate grooves 11a, 11b and the character-shaped convex portions 11c.

Then, for example, when the light-emitting member 11 is deactivated to stop light-emitting (unlighted), the luminous pattern of the shapes of the outer peripheral outline portion of the gate grooves 11a, 11b and the character-shaped convex portions 11c disappears from the face panel 9. Thus, the face panel 9 is returned to the original patternless surface.

As above, there is no need to form, in the face panel 9, the concave, stepped-shaped, elongate insertion hole large in width and depth, as described in the Background Art, so that it becomes possible to improve aesthetic appearance.

The light-emitting member 11 may be configured to be controlled in interlocking relation with an operation of an ignition switch in such a manner that it is lighted during a period (e.g., ACC or ON) other than during turn-off of the ignition switch, whereas it is unlighted during the turn-off of the ignition switch. In this case, the light-emitting member 11 can be automatically lighted and unlighted in interlocking relation with the operation of the ignition switch.

Further, the light-emitting member 11 is held by the set plate 10, and the concealing member 12 is attached to a lower side of the set plate 10 to cover the opening of the light-emitting member 11 from therebelow. This makes it possible to completely or almost completely prevent an internal mechanism of the operating device 1 from being seen through the face panel 9, during a lighted state of the light-emitting member 11. Thus, the aesthetic appearance is also improved in this respect.

The present invention is not limited to the configuration in which the concealing member 12 is slidably supported by the rail groove portions 10d of the set plate 10. For example, as one alternative, a configuration may be employed in which a stretchable rubber plate formed with a round hole which allows the operating lever shaft 3 to pass therethrough is attached to the lower surface of the set plate 10 to conceal the internal mechanism without hindering the movement of the operating lever shaft 3, by utilizing stretchability of the rubber plate. As another alternative, a configuration may be employed in which bendable long brush bristle-like elements are attached to the lower surface of the set plate 10 to conceal the internal mechanism without hindering the movement of the operating lever shaft 3, by utilizing bendability of the bristle-like elements.

The light-emitting member 11 in the above embodiment is prepared by forming a light guiding member (made, for example, of a transparent acrylic material) in a gate groove shape, and adapted to allow light from the illuminating lamp 15 to be transmitted through the gate groove-shaped member, and emit the transmitted light. Thus, the light-emitting member 11 can convert light from the illuminating lamp 15 into light having a gate groove shape or the like, and emit the converted light. In addition, the light guiding member may be made of a synthetic resin such as transparent acrylic resin, so that the light-emitting member 11 can be formed at a low cost even if it has a complicated gate groove shape.

The light-emitting member 11 is not limited to the type formed using a light guiding member. For example, as one alternative, the light-emitting member 11 may be composed of a large number of LEDs (light-emitting diodes). In this case, the light-emitting members are arranged along an outer peripheral outline portion of the gate grooves 10a, 10b and an outer peripheral outline portion of each of the through-holes 10c.

Figure 7A:
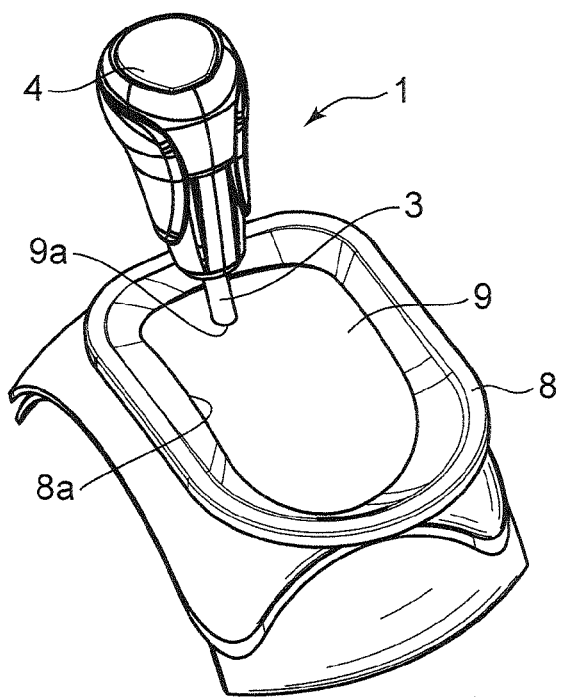
FIG. 7A is a perspective view of a vehicle transmission shift operating device according to a first modified embodiment, wherein a face panel is illustrated in a state when a light-emitting member is deactivated to stop light-emitting (unlighted).
Figure 7B:
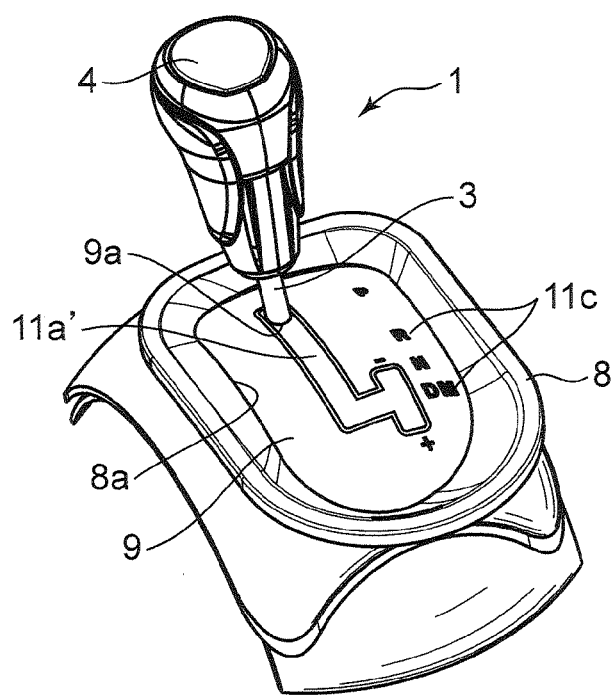
FIG. 7B is a perspective view of the vehicle transmission shift operating device according to the first modified embodiment, wherein the face panel is illustrated in a state when the light-emitting member is activated to emit light (lighted).

FIGS. 7A and 7B are perspective views partially illustrating a vehicle transmission shift operating device 1 according to a first modified embodiment. In FIG. 7A, the face panel 9 is illustrated in a state when a light-emitting member 11 is deactivated to stop light-emitting (unlighted). In FIG. 7B, the face panel 9 is illustrated in a state when the light-emitting member 11 is activated to emit light (lighted).

In the embodiment illustrated in FIG. 2, a region of the face panel 9 corresponding to an outer peripheral outline sub-portion of the gate groove 11a becomes luminous in a stepped shape. Differently, in the first modified embodiment illustrated in FIG. 7B, a region of the face panel 9 corresponding to an outer peripheral outline sub-portion of a gate groove 11a' becomes luminous in a linear shape. The present invention can be applied to a vehicle transmission shift operating device having such a linear-shaped gate groove 11a'.

Figure 8A:
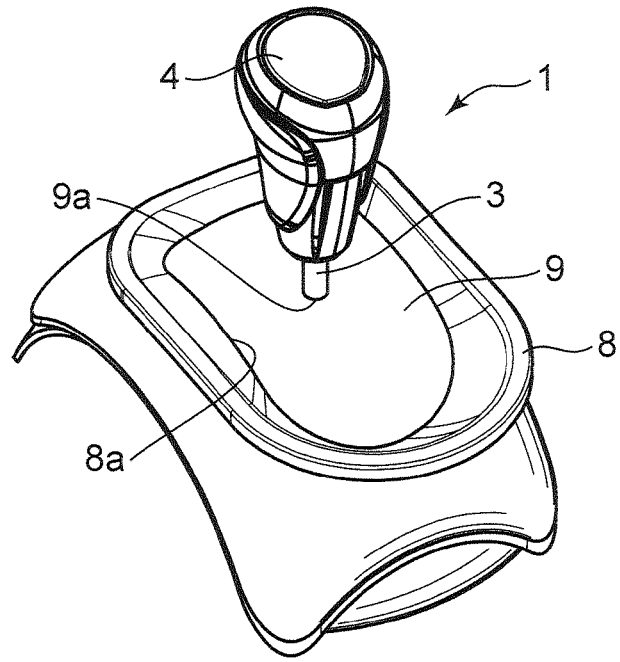
FIG. 8A is a perspective view of a vehicle transmission shift operating device according to a second modified embodiment, wherein a face panel is illustrated in a state when a light-emitting member is deactivated to stop light-emitting (unlighted).
Figure 8B:
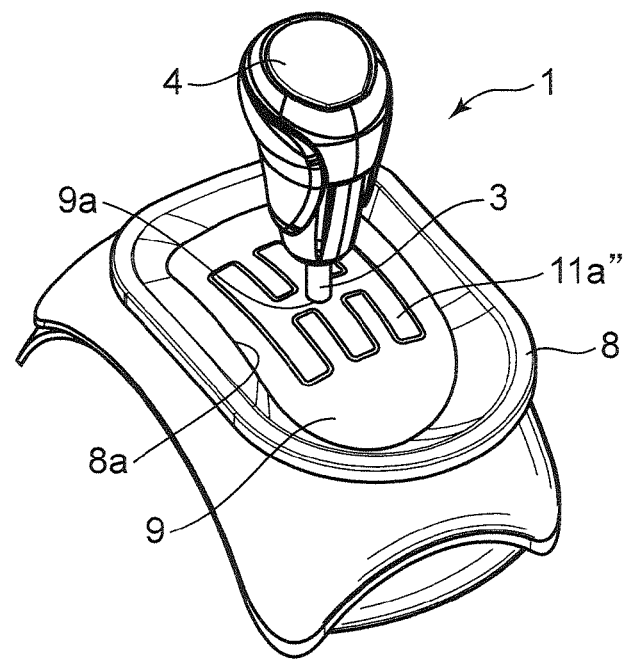
FIG. 8B is a perspective view of the vehicle transmission shift operating device according to the second modified embodiment, wherein the face panel is illustrated in a state when the light-emitting member is activated to emit light (lighted).

FIGS. 8A and 8B are perspective views partially illustrating a vehicle transmission shift operating device according to a second modified embodiment. In FIG. 8A, the face panel 9 is illustrated in a state when a light-emitting member 11 is deactivated to stop light-emitting (unlighted). In FIG. 8B, the face panel 9 is illustrated in a state when the light-emitting member 11 is activated to emit light (lighted).

The gate grooves 11a, 11a' illustrated in FIGS. 2 and 7B are designed for an automatic transmission (AT) vehicle. Differently, a gate groove 11a" illustrated in FIG. 8B is designed for a manual transmission (MT) vehicle. The present invention can be applied to a vehicle transmission shift operating device having such a gate groove 11a" for a manual transmission (MT) vehicle.

Figure 9:
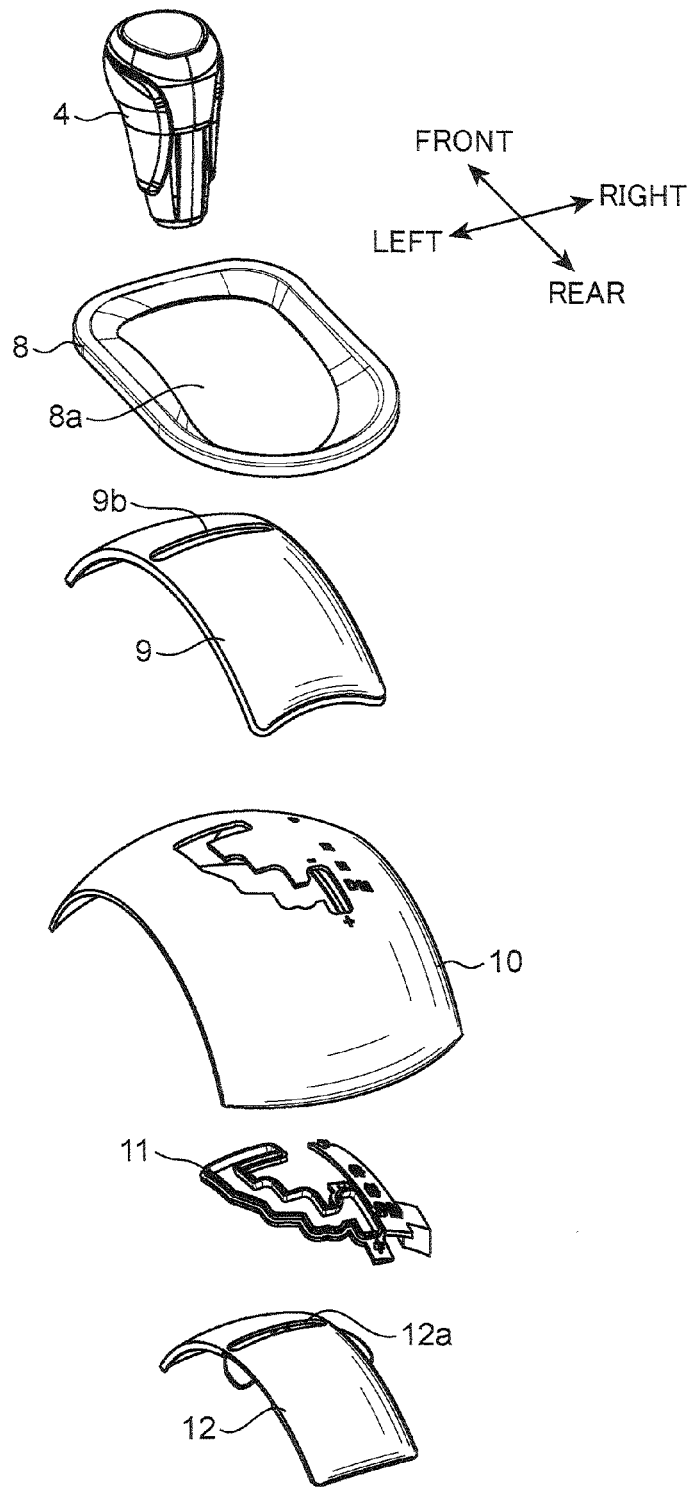
FIG. 9 is an exploded perspective view of an indicator for a vehicle transmission shift operating device according to a third modified embodiment.
Figure 11:
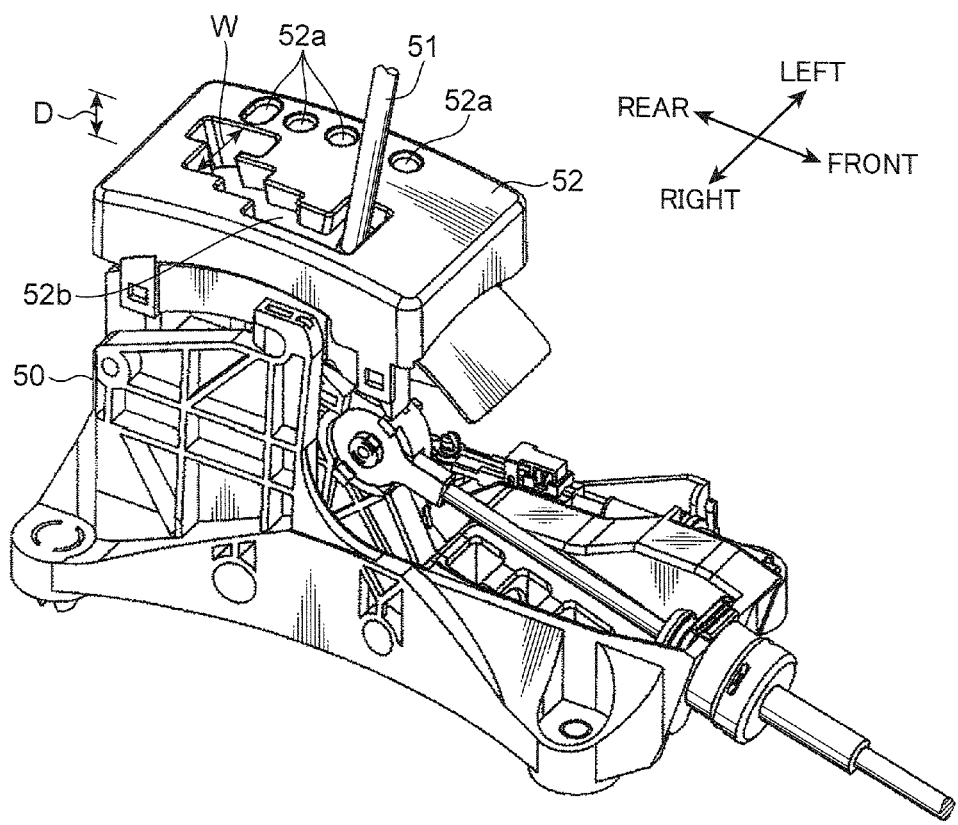
FIG. 11 is a perspective view of the vehicle transmission shift operating device described in the Background Art.

FIG. 9 is an exploded perspective view of an indicator section for a vehicle transmission shift operating device according to a third modified embodiment. A difference between the third modified embodiment and the embodiment illustrated in FIG. 4 is that a face panel 9 in the third modified embodiment is formed in approximately the same shape as that of the concealing member 12. Further, the face panel 9 is slidably supported in the front-rear direction by a pair of rail groove portions (not illustrated) formed at a position above the rail groove portions 10d for the concealing member 12. Furthermore, the face panel 9 is formed with an elongate through-hole 9b which is elongated in the right-left direction, in the same manner as that of the concealing member 12.

In the indicator configured as above, the face panel 9 and the concealing member 12 are assembled to the set plate 10 in such a manner that they are movably guided in the front-rear direction by the pair of rail groove portions 10d and the pair of rail groove portions (not illustrated) of the face panel 9, respectively.

FIGS. 10A to 10D illustrate an example of modification of the concealing member 12. FIG. 10A is an exploded perspective view of a modified concealing member 12, and FIGS. 10B to 10D are top plan views for explaining states when the modified concealing member 12 is moved.

The modified concealing member 12 comprises an upper member 12A having the same shape as that of the concealing member 12 in the above embodiment, and an approximately semicircular-shaped lower member 12B prepared separately from the upper member 12A. The lower member 12B is formed with a round hole 12d, and a shaft portion 12b formed on a lower surface of the upper member 12A is fitted into the round hole 12d. In this way, the lower member 12B is supported by the upper member 12A turnably in both of the right and left directions about the shaft portion 12b. The lower member 12B is formed with a U-shaped elongate through-hole 12c in a shape of cutout at a position corresponding to an elongate through-hole 12a of the upper member 12A.

The operating lever shaft 3 is installed to pass through the elongate through-hole 12a of the upper member 12A and the elongate through-hole 12c of the lower member 12B.

When the operating lever shaft 3 is located in an intermediate position in the right-left direction, the lower member 12B is placed in a neutral position in the right-left direction, as illustrated in FIG. 10C. Then, when the operating lever shaft 3 is moved in the left direction, the lower member 12B is inclined leftwardly from the neutral position along with the movement of the operating lever shaft 3, as illustrated in FIG. 10B. On the other hand, when the operating lever shaft 3 is moved in the right direction, the lower member 12B is inclined rightwardly from the neutral position along with the movement of the operating lever shaft 3, as illustrated in FIG. 10D.

As above, the modified concealing member 12 is composed of two components consisting of the upper member 12A and the lower member 12B. In this case, when the operating lever shaft 3 is tilted in the right-left direction along the elongate through-hole 12a of the upper member 12A (concealing member 12), the posture of the lower member 12B is changed so as to cover the elongate through-hole 12a. Thus, it becomes possible to prevent the internal mechanism from being seen through the face panel 9 during in the lighted state of the light-emitting member 11.

The structure composed of two components consisting of the upper member 12A and the lower member 12B may also be applied to the face panel 9 illustrated in FIG. 9. This makes it possible to completely or almost completely prevent the internal mechanism from being seen through the elongate through-hole 9b, irrespective of whether the light-emitting member is in the lighted state or in the unlighted state.

Outline of Embodiments

The above embodiments will be outlined below.

(1) An indicator according to one of the above embodiments is designed for a vehicle transmission shift operating device comprising a gate member formed with a gate groove which allows an operating lever shaft to pass therethrough. The indicator comprises: a light-emitting member capable of emitting light, wherein the light-emitting member has a segment with a shape corresponding to an outline of the gate groove; and a face panel disposed in opposed relation to the light-emitting member, and adapted, during the light-emitting of the light-emitting member, to allow light having the shape corresponding to the outline of the gate groove to be transmitted therethrough.

In this indicator, the face panel is devoid of the concave, stepped-shaped, elongate insertion hole as described in the Background Art. Thus, the entire outer surface of the face panel is formed as a smooth, patternless surface.

For example, when the light-emitting member is activated to emit light (lighted) during a period (e.g., ACC or ON) other than during turn-off of an ignition switch of an engine, light having an outline shape of the gate groove is emitted, and transmitted through the face panel. Thus, the outline shape of the gate groove appears on the smooth patternless outer surface of the face panel in the form of a luminous pattern.

A driver can ascertain an operation direction of the operating lever shaft by looking at the luminous pattern of the outline shape of the gate groove.

Then, for example, when the light-emitting member is deactivated to stop light-emitting (unlighted) by turning off the ignition switch of the engine, the luminous pattern of the outline shape of the gate groove disappears from the face panel. Thus, the face panel is returned to the original patternless outer surface.

As above, there is no need to form, in the face panel, the concave, stepped-shaped, elongate insertion hole large in width and depth, as described in the Background Art, so that it becomes possible to improve aesthetic appearance.

(2) Preferably, in the above indicator, the light-emitting member is disposed just above the gate member, and the face panel is disposed just above the light-emitting member to cover the light-emitting member, and formed with a through-hole which allows the operating lever shaft to pass therethrough, so that it is movable together with the operating lever shaft, wherein the indicator further comprises a cover member disposed just above the face panel and formed with an opening which surrounds a position where the light transmitted through the face panel appears on an outer surface of the face panel.

The face panel is devoid of the concave, stepped-shaped, elongate insertion hole as described in the Background Art, although it is formed with the through-hole which allows the operating lever shaft to pass therethrough. Thus, the face panel is generally configured to have a smooth, patternless surface.

For example, when the light-emitting member is activated to emit light (lighted) during a period (e.g., ACC or ON) other than during turn-off of an ignition switch of an engine, light having an outline shape of the gate groove is emitted, and transmitted through the face panel. Thus, the outline shape of the gate groove appears on the smooth patternless outer surface of the face panel in the form of a luminous pattern.

A driver can ascertain an operation direction of the operating lever shaft by looking at the luminous pattern of the outline shape of the gate groove.

Then, for example, when the light-emitting member is deactivated to stop light-emitting (unlighted) by turning off the ignition switch of the engine, the luminous pattern of the outline shape of the gate groove disappears from the face panel. Thus, the face panel is returned to the original patternless outer surface.

As above, there is no need to form, in the face panel, the concave, stepped-shaped, elongate insertion hole large in width and depth, as described in the Background Art, so that it becomes possible to improve aesthetic appearance.

(3) Preferably, the light-emitting member is adapted to be controlled in interlocking relation with an operation of an ignition switch in such a manner that it is lighted during a period other than during turn-off of the ignition switch, whereas it is unlighted during the turn-off of the ignition switch.

In this embodiment, the light-emitting member can be automatically lighted and unlighted in interlocking relation with the operation of the ignition switch.

(4) Preferably, the above indicator further comprises: a set plate attached to a base to support the light-emitting member; and a concealing member disposed just below the set plate to cover a lower side of the light-emitting member.

In this embodiment, it becomes possible to completely or almost completely prevent an internal mechanism of the operating device from being seen through the face panel, even during a lighted state of the light-emitting member. Thus, the aesthetic appearance is also improved in this respect.

(5) Preferably, the light-emitting member is formed using a light guiding member, and adapted to allow light from a light source to be transmitted therethrough, and emit the transmitted light.

In this embodiment, the light-emitting member is adapted to allow light from the light source to be transmitted therethrough, so that it can emit light having an outline shape of the gate groove. In addition, the light guiding member may be made of a synthetic resin such as transparent acrylic resin, so that the light-emitting member can be formed at a low cost even if it has a complicated gate groove shape.

(6) Preferably, the set plate has a rail groove portion, and each of the face panel and the concealing member is adapted to be movably guided in a front-rear direction by the rail groove portion, and formed with a through-hole which allows the operating lever shaft to pass therethrough, wherein the through-hole is formed as an elongate hole which is elongated in a right-left direction.

In this embodiment, each of the face panel and the concealing member is assembled to the set plate in such a manner that it is movably guided in the front-rear direction by the rail groove portion.

(7) A vehicle transmission shift operating device comprises: a base to which a gate member having a gate groove is fixed; an operating lever having an operating lever shaft installed to pass through the gate groove; and an indicator held by the base. The indicator includes: a light-emitting member capable of emitting light, wherein the light-emitting member has a segment with a shape corresponding to an outline of the gate groove; and a face panel disposed in opposed relation to the light-emitting member, and adapted, during the light-emitting of the light-emitting member, to allow light having the shape corresponding to the outline of the gate groove to be transmitted therethrough.

(8) An indicator for a vehicle transmission shift operating device comprising a base, a gate member formed with a gate groove and fixed to the base, and an operating lever having an operating lever shaft installed to pass through the gate groove of the gate member. The indicator comprises: a light-emitting member capable of emitting light, wherein the light-emitting member is disposed just above the gate member and having a segment with a shape corresponding to an outline of the gate groove; a face panel disposed just above the light-emitting member to cover the light-emitting member, and formed with a through-hole which allows the operating lever shaft to pass therethrough, so that it is movable together with the operating lever shaft, wherein the face panel is formed using a member which is not completely transparent but has a light transparency allowing light having the shape corresponding to the outline of the gate groove to be transmitted therethrough during the light-emitting of the light-emitting member; and a cover member disposed just above the face panel, and formed with an opening which surrounds a position where the light transmitted through the face panel appears on an outer surface of the face panel.

This application is based on Japanese Patent application No. 2012-031457 filed in Japan Patent Office on Feb. 16, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An indicator for a vehicle transmission shift operating device including and operating lever shaft and a gate member formed with a gate groove that allows the operating lever shaft to pass therethrough, the indicator comprising:
    a light-emitting member provided on the gate member and being capable of emitting light, the light-emitting member having a segment with a shape corresponding to an outline of the gate groove; and
    a face panel composed of a member made of a synthetic resin that has a light transparency and disposed in opposed relation to the light-emitting member, the face panel being disposed above the light-emitting member and covering the light-emitting member, the face panel being formed with a through-hole that allows the operating lever shaft to pass therethrough and being movable together with the operating lever shaft, and adapted, during light-emitting of the light-emitting member, to allow light having a shape corresponding to the outline of the gate groove to be transmitted therethrough.

2. The indicator as defined in claim 1, wherein:
    the light-emitting member is disposed just above the gate member; and
    wherein the indicator further comprises a cover member disposed just above the face panel and formed with an opening that surrounds a position where the light transmitted through the face panel appears on an outer surface of the face panel.

3. The indicator as defined in claim 1, wherein the light-emitting member is adapted to be controlled in interlocking relation with an operation of an ignition switch in such a manner that it is lighted during a period other than during turn-off of the ignition switch, whereas it is unlighted during the turn-off of the ignition switch.

4. The indicator as defined in claim 1, the indicator further comprising:
    a set plate attached to a base to support the light-emitting member; and
    a concealing member disposed just below the set plate to cover a lower side of the light-emitting member.

5. The indicator as defined in claim 4, wherein: the set plate has a rail groove portion; and
    each of the face panel and the concealing member is adapted to be movably guided in a front-rear direction by the rail groove portion, and formed with a through-hole which allows the operating lever shaft to pass therethrough, the through-hole being formed as an elongate hole which is elongated in a right-left direction.

6. The indicator as defined in claim 1, wherein the light-emitting member is formed using a light guiding member, and adapted to allow light from a light source to be transmitted therethrough, and emit the transmitted light.

7. A vehicle transmission shift operating device comprising:
    a base to which a gate member having a gate groove is fixed;

an operating lever having an operating lever shaft installed to pass through the gate groove; and an indicator held by the base, the indicator including: a light-emitting member provided on the gate member and being capable of emitting light, the light-emitting member having a segment with a shape corresponding to an outline of the gate groove; and a face panel composed of a member made of a synthetic resin that has a light transparency and disposed in opposed relation to the light-emitting member, the face panel being disposed above the light-emitting member and covering the light-emitting member, the face panel being formed with a through-hole that allows the operating lever shaft to pass therethrough and being movable together with the operating lever shaft, and adapted, during light-emitting of the light-emitting member, to allow light having a shape corresponding to the outline of the gate groove to be transmitted therethrough.

8. An indicator for a vehicle transmission shift operating device comprising a base, a gate member formed with a gate groove and fixed to the base, and an operating lever having an operating lever shaft installed to pass through the gate groove of the gate member, the indicator comprising:

a light-emitting member capable of emitting light, the light-emitting member being disposed just above the gate member and having a segment with a shape corresponding to an outline of the gate groove;

a face panel disposed above the light-emitting member to cover the light-emitting member, and formed with a through-hole that allows the operating lever shaft to pass therethrough, and being movable together with the operating lever shaft, the face panel being formed using a member that is not completely transparent but has a light transparency allowing light having the shape corresponding to the outline of the gate groove to be transmitted therethrough during the light-emitting of the light-emitting member; and a cover member disposed just above the face panel, and formed with an opening that surrounds a position where the light transmitted through the face panel appears on an outer surface of the face panel.

* * * * *